(12) United States Patent
Lacombe et al.

(10) Patent No.: US 10,316,894 B2
(45) Date of Patent: Jun. 11, 2019

(54) COUPLING DEVICE FOR CONNECTING A CLUTCH TO A TURBINE TRAIN

(71) Applicant: Siemens Aktiengesellschaft, Munich (DE)

(72) Inventors: Bernd Lacombe, Raesfeld (DE); Oliver Myschi, Duisburg (DE); Daniel Pieper, Hattingen (DE)

(73) Assignee: Siemens Aktiengesellschaft, Munich (DE)

( * ) Notice: Subject to any disclaimer, the term of this patent is extended or adjusted under 35 U.S.C. 154(b) by 208 days.

(21) Appl. No.: 15/303,048

(22) PCT Filed: Mar. 25, 2015

(86) PCT No.: PCT/EP2015/056384
§ 371 (c)(1),
(2) Date: Oct. 10, 2016

(87) PCT Pub. No.: WO2015/158511
PCT Pub. Date: Oct. 22, 2015

(65) Prior Publication Data
US 2017/0037908 A1    Feb. 9, 2017

(30) Foreign Application Priority Data

Apr. 15, 2014    (EP) .................................... 14164721

(51) Int. Cl.
*F01D 5/02*    (2006.01)
*F16D 1/076*    (2006.01)
(Continued)

(52) U.S. Cl.
CPC .............. *F16D 1/076* (2013.01); *F01D 5/02* (2013.01); *F01D 15/10* (2013.01); *H02K 7/1823* (2013.01); *F05D 2260/4023* (2013.01)

(58) Field of Classification Search
CPC .. F16B 3/06; F16B 13/04; F16B 13/06; F16B 13/063; F16B 13/065; F16B 13/066; F16D 1/033; F16D 1/076
See application file for complete search history.

(56) References Cited

U.S. PATENT DOCUMENTS 2,384,918 A * 9/1945 Houk ........................ F16B 2/04
403/297
2,490,554 A    12/1949 Snyder
(Continued)

FOREIGN PATENT DOCUMENTS

CN    2560784 Y    7/2003
EP    1288514 A2    3/2003
(Continued)

OTHER PUBLICATIONS

RU Office Action dated Nov. 19, 2017, for RU patent application No. 2016144448.
(Continued)

*Primary Examiner* — Jonathan P Masinick
(74) *Attorney, Agent, or Firm* — Beusse Wolter Sanks & Maire

(57) ABSTRACT

A coupling device for connecting a clutch to a turbine train, a turbine train having a clutch, and a method for connecting a clutch to a generator and to a turbine. The coupling device for connecting the clutch has a first coupling flange and a second coupling flange, wherein the first coupling flange and the second coupling flange each have at least one bore for accommodating a coupling bolt. The first coupling flange and the second coupling flange are centered in relation to each other by means of at least one coupling bolt, which is inserted into the bores in the first and in the second coupling flange.

12 Claims, 2 Drawing Sheets

(51) Int. Cl.
*F01D 15/10* (2006.01)
*H02K 7/18* (2006.01)

(56) References Cited

U.S. PATENT DOCUMENTS

| | | | |
|---|---|---|---|
| 3,099,470 A * | 7/1963 | Zumbusch | F16B 3/06 29/464 |
| 4,743,138 A | 5/1988 | Goy | |
| 5,331,811 A | 7/1994 | Giberson | |
| 5,775,831 A | 7/1998 | Mullenberg | |
| 6,039,497 A | 3/2000 | Gullberg | |
| 9,028,210 B2 * | 5/2015 | Sankolli | F16B 19/02 415/209.2 |
| 2006/0188372 A1 | 8/2006 | Hansen | |
| 2008/0314472 A1 | 12/2008 | Werner et al. | |
| 2011/0162341 A1 | 7/2011 | Parry et al. | |

FOREIGN PATENT DOCUMENTS

| | | |
|---|---|---|
| EP | 1288514 B1 | 7/2007 |
| FR | 1053495 A | 2/1954 |
| GB | 2072275 A | 9/1981 |
| JP | S56143817 A | 11/1981 |
| JP | H03125918 U | 12/1991 |
| JP | H1078042 A | 3/1998 |
| JP | 2006234165 A | 9/2006 |
| JP | 2011137456 A | 7/2011 |
| JP | 2011526349 A | 10/2011 |
| RU | 2087290 C1 | 8/1997 |
| RU | 2007144196 A | 6/2009 |
| RU | 2469220 C2 | 12/2012 |
| WO | 8802074 A1 | 3/1988 |
| WO | 1988002074 A1 | 3/1988 |
| WO | 2008107516 A1 | 9/2008 |
| WO | 2009158401 A1 | 12/2009 |
| WO | WO-2018035264 A1 * | 2/2018 ............... F16B 3/06 |

OTHER PUBLICATIONS

JP Office Action dated Nov. 20, 2017, for JP patent application No. 2016-562525.
International Search Report dated Sep. 4, 2015, for PCT application No. PCT/EP2015/056364.
EP Search Report dated Sep. 15, 2014, for EP application No. 14164721.4.
CN search report dated May 25, 2018, for CN patent application No. 201580020271.6.

* cited by examiner

COUPLING DEVICE FOR CONNECTING A CLUTCH TO A TURBINE TRAIN

CROSS REFERENCE TO RELATED APPLICATIONS

This application is the US National Stage of International Application No. PCT/EP2015/056384 filed Mar. 25, 2015, and claims the benefit thereof. The International Application claims the benefit of European Application No. EP14164721 filed Apr. 15, 2014. All of the applications are incorporated by reference herein in their entirety.

FIELD OF INVENTION

The present invention relates to a coupling device for connecting a clutch to a turbine train, to a turbine train having a clutch and to a method for connecting a clutch to a generator and to a turbine.

BACKGROUND OF INVENTION

In order to couple a steam turbine to a generator with a gas turbine in a single-shaft plant, use is made of a clutch by means of which, during operation, the steam turbine can be coupled—directly or indirectly by means of an intermediate shaft—to the generator with the connected gas turbine. Such a clutch is known from the prior art. In the case of clutches of this type, the coupling flange of the generator or the turbine is machined separately from the flanges of the clutch since the clutches are to be exchangeable and otherwise chips penetrate into the clutch during the machining procedure, for example in the case of common honing. For this reason, in the case of the known clutches, massive coupling bolts are installed with a relatively large amount of play in order to be able to ensure that assembly is possible for all possible tolerances of position and size of the coupling bores. These clutches are centered by means of what is termed a recess which is inserted with a transition fit into the coupling connection while the coupling bolts have no influence on centering. This means that the coupling connection has a certain amount of play with respect to the clutch and the circular motion of the turbine train cannot be reproduced and is negatively influenced.

Since the internal side of the coupling flange of the clutch is generally not accessible, it is not currently possible to use continuous coupling bolts that would permit axial clamping with attachment on both sides.

SUMMARY OF INVENTION

The invention has an object of providing a coupling device for connecting to a clutch, in which, in spite of the coupling flanges being accessible only from one side, these can be securely and reproducibly attached to one another, wherein the clutch coupled thereto remains exchangeable and there is no need for onerous common machining.

The coupling device according to the invention for connecting the clutch, having the features of the independent claim, offers the advantage, over the coupling elements known from the prior art, that centering of the coupling flanges is effected by means of at least one connecting element that is inserted into the bores in the coupling flange and into the bore in the coupling flange of the clutch. This makes it possible to achieve reproducible attachment and thus a greater degree of concentricity and better balance.

Advantageous refinements of and improvements to the coupling device indicated in the independent claim are made possible by the measures set out in the dependent claims.

One advantageous refinement consists in an axial stop for positioning the connecting element being formed on the turbine- or generator-side coupling flange. This makes it possible to simply and reproducibly ensure the position of the bolt, in particular during assembly, with respect to the two coupling flanges, without the need for an axial screw connection. In that context, it is particularly advantageous if the axial stop is integrated into a bore in the coupling flange, for example as a stepped bore, such that no additional machining of either of the two coupling flanges is necessary.

Another advantageous refinement consists in the connecting element being embodied as an expansion bolt with an internal expansion mechanism. An embodiment as an expansion bolt allows the connecting element to be used both for centering the two coupling flanges with respect to one another and for a play-free and form-fitting connection for the purpose of torque transmission. In order to establish an optimum form fit between the expansion bolt and the coupling flange, it is advantageous for the expansion bolt to have a sleeve with a conical internal face and a bolt with a conical external face. Conical faces on the internal and external faces are a simple and cost-effective solution for creating an expansion bolt.

In that context, it is particularly advantageous if the expansion bolt has axial slots by means of which the expansion function can be brought about in a simple manner by tightening a screw connection that is operatively connected to the expansion bolt.

Another advantageous refinement consists in the coupling flanges having multiple bores evenly distributed around the circumference, wherein each bore receives an expansion bolt. Multiple expansion bolts, advantageously evenly distributed around the circumference, in the bores of the coupling flanges allow the transmission of higher forces and torques. In addition, manufacturing-dependent discrepancies between the individual bores can be equalized to a large degree by the expansion bolts, in that the expansion bolts are tightened to different extents or in a different sequence, that is to say not clockwise or counter-clockwise but in alternation. This saves on cost-intensive, common machining, for example common honing of the bores. In addition, this means that the clutch remains simple to exchange, which reduces overhaul and maintenance costs.

Another application for a coupling element according to the invention for connecting a clutch relates to the described clutch of a steam turbine with a generator and a gas turbine in a power plant.

BRIEF DESCRIPTION OF THE DRAWINGS

An exemplary embodiment of the coupling device according to the invention for connecting the clutch will be explained below with reference to the appended drawings. In that context, identical components or components having identical functions are labeled with identical reference signs.

DETAILED DESCRIPTION OF INVENTION

Figure 1:
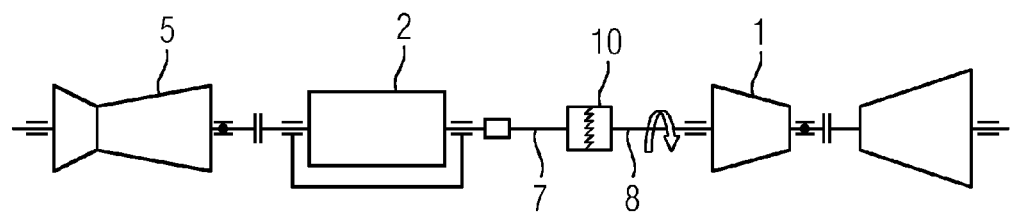
FIG. 1 shows a turbine train with a clutch.

FIG. 1 shows a turbine train. The turbine train comprises a steam turbine 1, a gas turbine 5 and a generator 2, wherein the generator 2 is also coupled to the steam turbine 1 via a clutch 10. For coupling the clutch, coupling flanges 20, 50 are formed on a generator shaft 7 that connects the clutch 10 to the generator 2 and on a turbine shaft 8 that connects the clutch 10 to a turbine 1, 5, in particular to the steam turbine 5.

Figure 2:
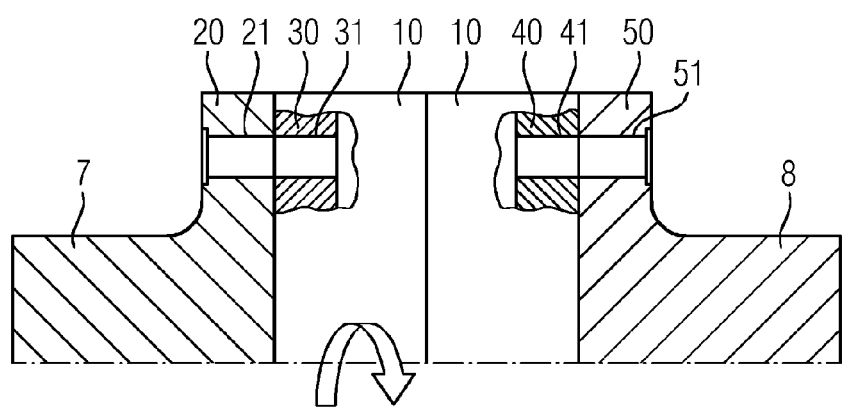
FIG. 2 shows, schematically, a clutch that is connected, by means of a coupling device according to the invention, to the coupling flanges, arranged on either side, of the steam turbine shaft and the generator shaft.

FIG. 2 shows a coupling device according to the invention for connecting a generator 2 or a generator shaft 7. The coupling device comprises a first coupling flange 20 that is formed on the generator shaft 7 and a second coupling flange 50 that is formed on the turbine shaft 8. The two coupling flanges 20, 50 each have through-bores 21, 51. The clutch 10 has an internal coupling flange 30, 40 at each of its two ends. The internal coupling flanges 30, 40 of the clutch 10 each have blind bores 31, 41. The clutch 10 can be connected to the shafts 7, 8 by, on one side, connecting the coupling flange 20 of the generator shaft 7 to the first internal coupling flange 30 of the clutch 10 by means of connecting elements 12, in particular expansion bolts 13, and by connecting the turbine shaft 8, via the coupling flange 50 with connecting elements 12, in particular with expansion bolts 13, to the second internal coupling flange 40 of the clutch 10.

Figure 3:
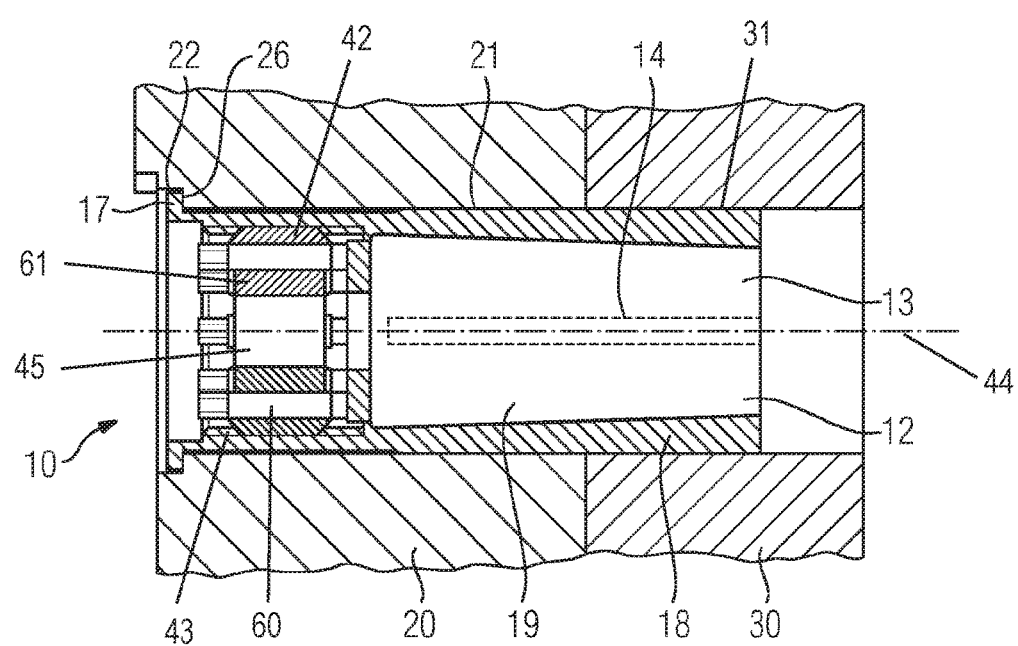
FIG. 3 shows an exemplary embodiment of a coupling device according to the invention for connecting a clutch to a turbine train.

FIG. 3 shows a connection of the generator 2 via the generator shaft 7. The coupling flange 20 is formed on the generator shaft 7. The coupling flange 20 is connected to the internal coupling flange 30 on the clutch 10, wherein the first coupling flange 20 has a bore 21 and the second coupling flange 30 has a bore 31. The bore 21 of the first coupling flange 20 has a shoulder 22 that serves as an axial stop 26 for a connecting element 12 inserted into the bores 21, 31. The connecting element 12 has, at its end oriented toward the first coupling flange 20, a collar 17 that rests against the shoulder 22. The connecting element 12 is embodied as an expansion bolt 13. In that context, the expansion bolt 13 is dimensioned such that the expansion bolt 13 in the unloaded state is inserted with a clearance fit into the bores 21, 31 of the coupling flanges 20, 30. The stop 26 and the collar 17 on the expansion bolt 13 define the axial position of the expansion bolt 13, such that the expansion bolt 13 is reliably positioned with respect to the two coupling flanges 20, 30. The expansion bolt 13 has a slotted sleeve 18, wherein a slot 14 is formed in the axial direction of the sleeve 18 of the expansion bolt 13. Wedging the sleeve 18 with the internal cone 19 of the expansion bolt 13 increases the external diameter of the expansion bolt 13, such that the expansion bolt 13 centers the first coupling flange 20 and the second coupling flange 30 with respect to one another. This produces a form-fitting and play-free connection between the expansion bolt 13 and the two coupling flanges 20, 30, such that a torque can be transmitted via the clutch 10 and the position of the coupling flanges 20, 30 with respect to one another can be reproducibly guaranteed.

To make it possible to simply exchange the expansion bolts 13, the external diameter of the expansion bolt 13 returns to its original dimensions when the cone 19 is released from the sleeve 18 of the expansion bolt 13, and the expansion bolt 13 can thus easily be withdrawn from the bores 21, 31 in the coupling flanges 20, 30.

In order to transmit larger torques, multiple bores 21, 31, in particular 4 to 20 bores, are evenly distributed over the circumference of the coupling flanges 20, 30. This makes it possible to equalize different tolerance positions of the bores 21, 31 and of the expansion bolts 13 by means of expansion bolts 13 that are tightened to different extents and in an alternating sequence. An alternating sequence is to be understood in this context as meaning that the expansion bolts are tightened not one after the other in the clockwise or counter-clockwise direction, but first one expansion bolt 13, then a second expansion bolt 13 offset by approximately 180°, and then another expansion bolt 13 which is not arranged in the immediate vicinity of the first or the second expansion bolt 13. In that context, it is advantageous if the expansion bolts 13 are first inserted loose and then respective opposite expansion bolts 13 are tightened in order to achieve mutual centering of the coupling flanges 20, 30 that is as good and as reproducible as possible.

As shown in FIG. 3, the coupling device has a displacement device 60 for the axial displacement of the internal cone 19 (a.k.a. a bolt). In that context, the displacement device 60 has a thread element 61 that is arranged on the end face side and has an external thread 42. This external thread 42 engages in an internal thread 43 of the sleeve 18 and in that context is designed such that rotation of the thread element 61 results in axial displacement of the internal cone 19. The internal cone 19 has a central axis 44 that passes through a bore 45 in the thread element 61.

Although the invention has been described in detail by way of the preferred exemplary embodiments, the invention is not restricted to the disclosed exemplary embodiments and other variations can be derived herefrom by a person skilled in the art without departing from the scope of protection of the invention.

The invention claimed is:

1. A coupling device for connecting a clutch to a turbine train, comprising:
   a first coupling flange and a second coupling flange, wherein the first coupling flange and the second coupling flange each comprise at least one bore for receiving a connecting element,
   wherein the at least one bore in the second coupling flange comprises a blind bore,
   wherein the first coupling flange and the second coupling flange are centered with respect to one another by means of the connecting element which is inserted into the bores in the first and in the second coupling flange,
   wherein the connecting element is embodied as an expansion bolt,
   wherein the expansion bolt comprises a sleeve body comprising a conical internal face and a bolt comprising a conical external face, and
   a displacement device for axial displacement of the bolt, wherein the displacement device comprises a thread element, arranged on an end face side, comprising an external thread that engages in an internal thread in the sleeve body and is designed such that rotation of the thread element produces the axial displacement of the bolt and expansion of the sleeve body.

2. The coupling device for connecting a clutch as claimed in claim 1, further comprising:
   an axial stop for positioning the connecting element which is formed on the first coupling flange or on the second coupling flange.

3. The coupling device for connecting a clutch as claimed in claim 2,
   wherein the axial stop is formed on the first coupling flange or on the second coupling flange, in a respective at least one bore.

4. The coupling device for connecting a clutch as claimed in claim 1, wherein the sleeve body of the expansion bolt comprises one or more slots.

5. The coupling device for connecting a clutch as claimed in claim 4,
wherein the slots are formed in an axial direction of the sleeve body.

6. The coupling device for connecting a clutch as claimed in claim 1,
wherein the at least one bore comprises multiple bores which are distributed evenly over a circumference of the coupling flange.

7. The coupling device for connecting a clutch as claimed in claim 6,
wherein the multiple bores are machined separately from one another.

8. The coupling device for connecting a clutch as claimed in claim 6,
wherein the at least one bore comprises 4 to 20 bores which are distributed evenly over the circumference of the respective coupling flange.

9. A turbine train comprising:
a turbine and a generator,
wherein the generator is coupleable, at least indirectly, to the turbine via a clutch,
wherein coupling is effected via the clutch,
wherein the clutch comprises the second coupling flange as claimed in claim 1, and
wherein the turbine train comprises the coupling device as claimed in claim 1.

10. A method for coupling a generator to a turbine, comprising:
connecting the generator to the turbine via a clutch, in that a first, generator-side external coupling flange and a second, turbine-side external coupling flange are each connected to a respective internal coupling flange of the clutch, and each external coupling flange comprises at least one through-bore for receiving a respective connecting element,
wherein the first, generator-site external coupling flange and the second, turbine-side external coupling flange are centered with respect to the respective internal coupling flange of the clutch, in each case by means of the respective connecting element, that is positioned in a respective through-bore of the at least one through-bore in the respective external coupling flange and a respective blind bore in the respective internal coupling flange,
wherein an end of the respective connecting element must be inserted into the respective through-bore first to access and then be inserted into the respective blind bore,
wherein the respective connecting element is embodied as an expansion bolt,
wherein the expansion bolt comprises a sleeve body comprising a conical internal face and a bolt comprising a conical external face,
wherein a displacement device axially displaces the bolt, and
wherein the displacement device comprises a thread element, arranged on an end face side, comprising an external thread that engages in an internal thread in the sleeve body and designed such that rotation of the thread element produces axial displacement of the bolt and expansion of the sleeve body.

11. The method as claimed in claim 10, further comprising:
transmitting torque between the first, generator-side external coupling flange and a first coupling flange of the clutch, and between the second, turbine-side external coupling flange and a second coupling flange of the clutch by means of a play-free form fit, wherein the expansion bolt is wedged within the bores of the coupling flanges so as to establish the play-free form fit between the expansion bolt and, in each case, a respective coupling flange and a respective coupling flange of the clutch.

12. An apparatus, comprising:
a first flange comprising a through bore;
a second flange comprising a dead-end bore that does not extend fully through the flange;
an expandable sleeve body comprising a conical inner surface toward one end and internal threads toward another end;
a bolt comprising a conical body configured to cooperate with the conical inner surface to expand the expandable sleeve body when the conical body is moved axially inside the expandable sleeve body; and
a displacement device comprising external threads configured to interact with the internal threads of the expandable sleeve body and to cause the bolt to move axially inside the expandable body when the displacement device is rotated,
wherein the expandable sleeve body fits in the through bore and the dead-end bore.

* * * * *